United States Patent [19]

Hageman

[11] Patent Number: 4,955,923
[45] Date of Patent: Sep. 11, 1990

[54] HYDRAULICALLY OPERATED DOCKBOARD

[75] Inventor: Martin P. Hageman, Mequon, Wis.

[73] Assignee: Kelley Company Inc., Milwaukee, Wis.

[21] Appl. No.: 466,054

[22] Filed: Jan. 16, 1990

Related U.S. Application Data

[63] Continuation-in-part of Ser. No. 276,241, Nov. 25, 1988, abandoned.

[51] Int. Cl.$^5$ .............................................. E01D 1/00
[52] U.S. Cl. ...................................... 14/71.7; 14/71.3; 91/224; 91/422
[58] Field of Search ...................... 14/71.1, 71.3, 71.7; 91/222, 224, 422

[56] References Cited

U.S. PATENT DOCUMENTS

| | | | |
|---|---|---|---|
| 3,170,179 | 2/1965 | Layne | 14/71.3 |
| 3,175,238 | 3/1965 | Pennington | 14/71.7 |
| 3,290,709 | 12/1966 | Whitenack, Jr. | 14/71.7 |
| 3,290,710 | 12/1966 | Whitenack, Jr. | 14/71.7 |
| 3,345,665 | 10/1967 | Anderson, Jr. | 14/71.7 |
| 3,388,413 | 6/1968 | Clarke | 14/71.7 |
| 3,656,199 | 4/1972 | Bregantini | 14/71.7 |
| 4,365,374 | 12/1982 | Bennett | 14/71.7 |
| 4,641,388 | 2/1987 | Bennett | 14/71.7 |
| 4,800,604 | 1/1989 | Alten | 14/71.3 |
| 4,827,549 | 5/1989 | Walker | 14/71.7 |

FOREIGN PATENT DOCUMENTS 717691 9/1965 Canada ................................. 14/71.7

Primary Examiner—Bruce M. Kisliuk
Attorney, Agent, or Firm—Andrus, Sceales, Starke & Sawall

[57] ABSTRACT

A hydraulically operated dockboard including a ramp which is hinged at its rear edge to the frame of the dockboard, and a lip is hinged to the forward edge of the ramp and can be pivoted between a downwardly hanging pendant position and an extended position. A main hydraulic cylinder unit interconnects the frame and the ramp and by operating the cylinder unit the ramp can be pivoted upwardly from a horizontal cross traffic position to an upwardly inclined position. A lip cylinder unit interconnects the ramp and the lip, and operation of the lip cylinder unit will pivot the lip from the pendant to an extended position. The hydraulic system is constructed so that fluid is initially supplied to the main cylinder unit by a pump to raise the ramp, and when the main cylinder unit is fully extended, the increased pressure will shift a valve to supply fluid to the lip cylinder unit. The valve is constructed so that the valve will be maintained in the shifted position by substantially less pressure than that required to initially shift the valve. When operation of the pump is discontinued, the ramp will descend and the back pressure generated by the weight of the lip acting against the valve will retain the valve in the shifted position to maintain the lip in the extended condition until the lip engages the bed of a truck.

10 Claims, 3 Drawing Sheets

HYDRAULICALLY OPERATED DOCKBOARD

RELATED APPLICATIONS

This is a continuation-in-part of application Ser. No. 07/276,241, filed Nov. 25, 1988.

BACKGROUND OF THE INVENTION

The conventional hydraulic dockboard is mounted in a pit or depression in the loading dock and includes a ramp which is pivoted at its rear edge to the frame or supporting structure. In addition, a lip is hinged to the forward edge of the ramp and is movable between a downwardly hanging pendant position and an extended position where it forms an extension to the ramp. When in use, the extended lip will engage the bed of a truck positioned in front of the loading dock to bridge the gap between the dock and the truck. After the loading operation is completed and the truck pulls away from the dock, the lip will pivot downwardly to the pendant position, and the ramp will pivot downwardly to a stored position.

In a conventional hydraulically operated dockboard, a main hydraulic cylinder unit interconnects the frame and the ramp, and acts to pivot the ramp from a horizontal dock level position to the upwardly inclined position. In addition, a lip cylinder unit interconnects the ramp and the lip and pivots the lip from the downwardly hanging pendant position to the extended position.

U.S. Pat. Nos. 4,365,374 and 4,641,388 describe hydraulically operated dockboards in which the flow of hydraulic fluid to the lip lifting cylinder is controlled by, and supplied through, the main hydraulic cylinder unit. In accordance with U.S. Pat. No. 4,641,388, a two-way control valve is mounted in the pressure line extending between the main hydraulic cylinder and the lip lifting cylinder and the valve is also connected to a return line leading to the reservoir for the hydraulic system. Thus, the valve connects the lip lifting cylinder to either the pressure supply line or to the return line. When the main hydraulic cylinder unit is operated to raise the ramp, the piston rod of the cylinder is extended, and as the piston approaches the end of its stroke of travel, a passage is opened which supplies hydraulic fluid from the end of the main cylinder unit through the pressure line to the lip lifting cylinder to thereby operate the lip lifting cylinder and pivot the lip to the extended position.

As described in the aforementioned patent, when the flow of pressurized fluid to the main cylinder unit is terminated, the combined weight of the ramp and lip will cause the main cylinder unit to retract and the ramp will pivot downwardly until the extended lip engages the bed of a truck parked in front of the loading dock. A restricted orifice in the return line extending between the main cylinder and the reservoir will control the rate of descent of the ramp, resulting in the pressure being maintained in the main cylinder and the lip cylinder until the descent of the ramp is arrested.

When the extended lip engages the bed of the truck, the pressure in both the main cylinder unit and the lip lifting cylinder will drop to near ambient pressure and the drop in pressure will enable a biasing force to move the control valve to a position where the lip cylinder is connected to the reservoir via the return line. After the loading operation has been completed, the lip will pivot downwardly by gravity, forcing the fluid from the lip cylinder through the valve and back to the reservoir.

With the construction of U.S. Pat. No. 4,641,388 the lip will return to its downwardly hanging pendant position without the necessity of the ramp being moved to a below dock position.

SUMMARY OF THE INVENTION

The invention is directed to an improved hydraulic system for a dockboard. In accordance with the invention, a supply line or conduit interconnects the reservoir of the hydraulic system with the main cylinder unit. On operation of the pump, the increased pressure will pivot a shuttle valve connected in the supply line to thereby supply pressurized fluid to the main cylinder unit to raise the ramp to its upper inclined position. When the main cylinder unit reaches its fully extended position, the pressure will increase and the increased pressure acts through a bypass conduit to shift a second valve against a biasing force and permit flow through the second valve to the lip cylinder to thereby extend the lip from the pendant to the extended position.

The second valve is constructed such that once shifted by a predetermined pressure, a reduced pressure will maintain it in a shifted condition, allowing the system pressure to be low while extending the lip.

On discontinuation of operation of the pump, the ramp will descend and the pressure in the system will decrease, but the reduced pressure will maintain the second valve in the shifted position. As the back pressure created in the main cylinder unit by the weight of the ramp is greater than the back pressure generated by the weight of the lip, the lip cylinder is maintained in an extended position.

When the extended lip engages the truck bed, the pressure drops to near ambient which acts to shift the second valve back to its original position to enable fluid to be returned from the lip cylinder to the reservoir. When the truck pulls away from the loading dock, the lip will then be able to fall by gravity to its pendant downwardly hanging position.

The invention also includes a novel piston construction for the main cylinder unit in which the piston is provided with a longitudinal passage which communicates with opposite ends of the cylinder. A valve is mounted within the passage and is constructed so that it is biased to an open position and fluid can freely flow through the passage as the piston rod is extended and retracted in raising and lowering the ramp. However, the valve will close and act as a velocity fuse to prevent rapid descent of the ramp in the event a predetermined external downward force is applied to the ramp as for example, if a truck accidentally pulls away from the loading dock when an added load, such as a fork lift truck, is on the ramp. The piston construction enables the cylinder to have only a single port which is located in a position which allows any air in the cylinder to escape as the ramp is lowered, thus providing a self-bleeding operation.

The invention provides a simplified and less costly hydraulic system for a hydraulically operated dockboard. Only two fluid lines or conduits are required, one extending to the main cylinder and the other to the lip cylinder. The construction as used in the past required six separate hydraulic lines and a corresponding number of fittings or connections. Thus, the invention provides a more aesthetically attractive unit, as well as substantially reducing the potential for fluid leakage.

By building the velocity fuse directly into the piston of the main cylinder unit, a less costly construction is achieved. Moreover, as the velocity fuse is located internally of the cylinder, tampering is eliminated as can occur when the velocity fuse is locate externally.

In a modified form of the invention, the pressure required to unseat the lip control valve to supply fluid to the lip cylinder is adjustable independently of the pressure required to return the lip control valve to its seated position. Thus, the unseating pressure can be adjusted according to the size and weight of the ramp of the dockboard without altering the return pressure for the valve. This provides a more precise control of the lip action.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
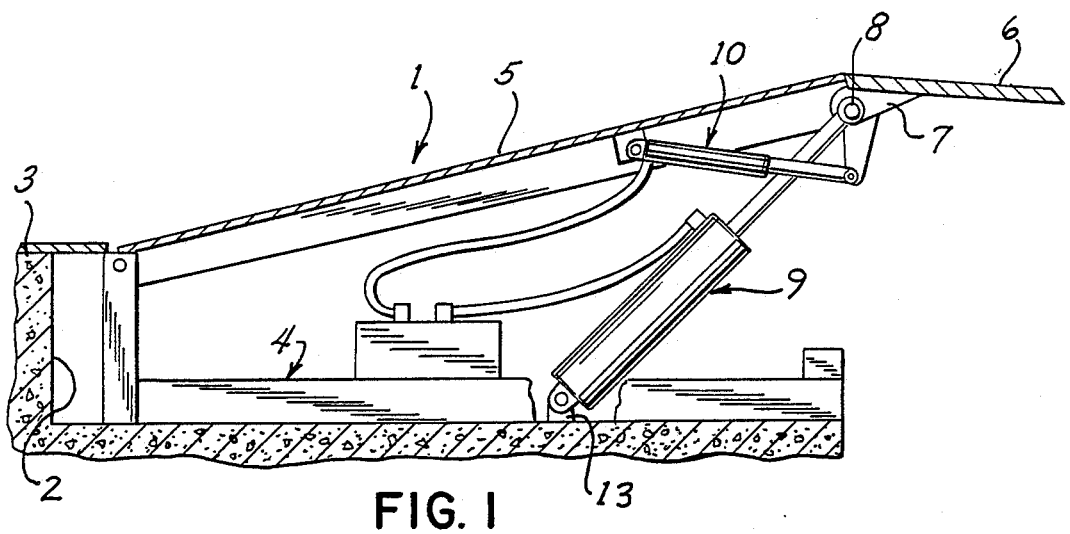
FIG. 1 is a side elevation of a hydraulic dockboard incorporating the hydraulic system of the invention with the ramp shown in the upwardly inclined position and lip in the extended position.

FIG. 1 illustrates a dockboard 1 that is mounted within a pit or depression 2 in a loading dock 3. The dockboard is intended to bridge the gap between the loading dock and the bed of a truck which is located in front of the dock.

Dockboard 1 includes a supporting frame 4 and the rear end of a ramp or deckplate 5 is pivoted to the frame so that the ramp is movable from a generally horizontal dock level position, where the ramp is generally flush with the upper surface of the dock 3, to an upwardly inclined position, as shown in FIG. 1.

Hinged to the forward edge of ramp 5 is a lip 6 which can be pivoted from between a downwardly hanging pendant position and an outwardly extended position as shown in FIG. 1, where the lip forms an extension to the ramp. The lip is hinged to ramp 5 by a series of lugs 7 which are connected to the underside of the lip and are mounted for rotation on a hinge pin 8 that is connected to the forward end of the ramp. The construction of the frame, ramp and lip is conventional and is of a type such as shown in U.S. Pat. No. 4,068,338.

A main cylinder unit 9 interconnects the frame 4 and the ramp 5 and serves to pivot the ramp from the horizontal dock level position to the upwardly inclined position, while a second lip lifting cylinder unit 10 interconnects the ramp and the lip 6 and serves to pivot the lip to the extended position.

Main cylinder unit 9 includes a cylinder 11 and a bracket mounted on the lower end of the cylinder is pivotally connected to lugs 13 on frame 4.

Cylinder 11 is composed of a generally cylindrical outer shell 14, the ends of which are enclosed by an upper head 15 and a lower base 16. A piston 17 is mounted for sliding movement in shell 14 and carries a piston rod 18 that extends through upper head 15. The outer end of piston rod 18 is pivotally connected to hinge pin 8.

Hydraulic fluid is supplied to the upper end of cylinder 11 through a fitting 19.

Figure 2:
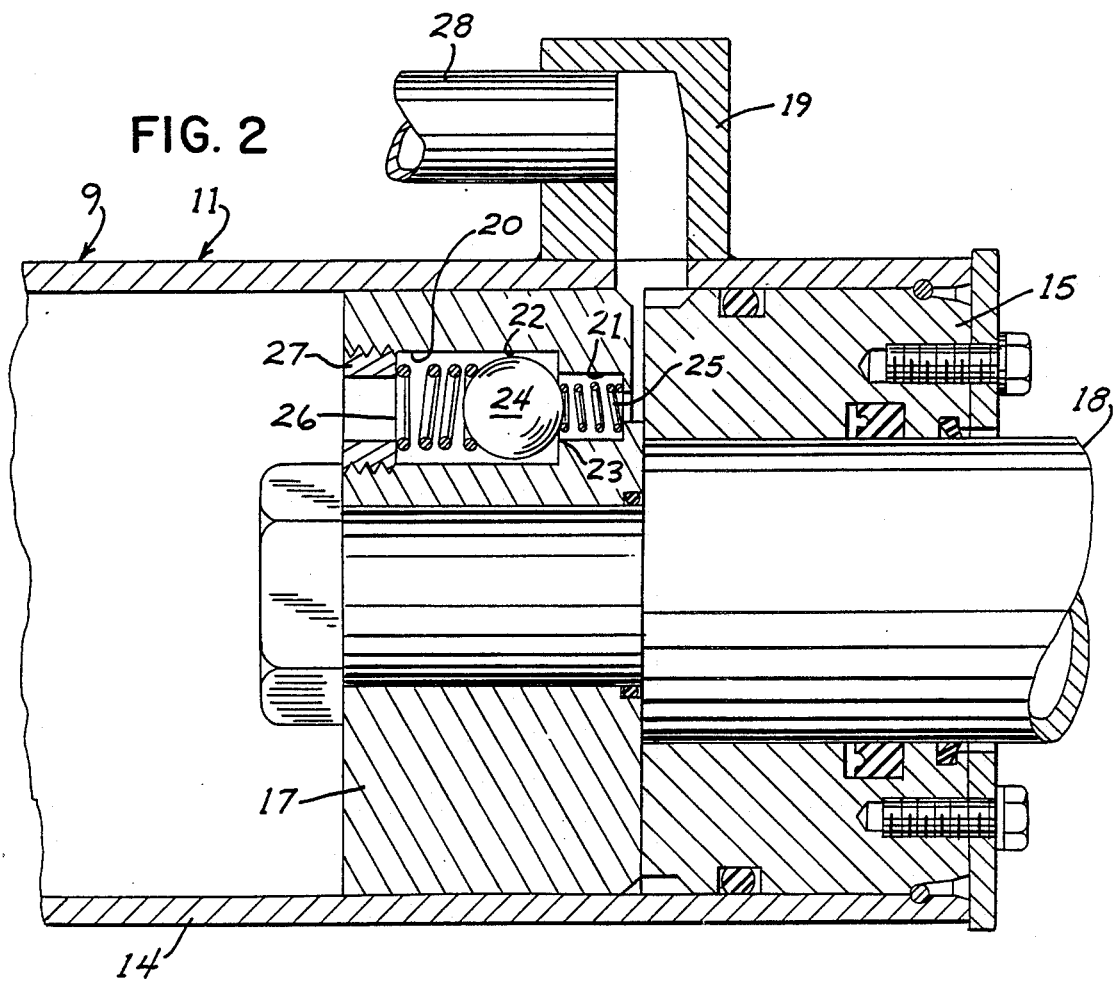
FIG. 2 is a fragmentary longitudinal section of the main cylinder unit for elevating the ramp.

As best shown in FIG. 2, piston 17 is provided with a longitudinal passage 20 which is offset laterally from the center axis of the piston. Passage 20 includes a small diameter section 21 and a large diameter section 22 which are separated by a valve seat 23. A valve ball 24 is mounted within the section 22 and cooperates with the valve seat 23. Valve ball 24 is normally maintained in an open condition with respect to valve seat 23 by a pair of springs 25 and 26. Spring 25 is interposed between the end of passage section 21 and the valve ball 24, while spring 26 engages the opposite side of the valve ball and is retained within passage section 22 by annular retainer 27 which is threaded within the end of the passage section 22.

With the construction of the valve 24, hydraulic fluid can flow freely through the passage 20 as the piston moves within the cylinder 11. However, if a predetermined downward force is applied to the ramp, as for example, in the event a truck accidentally pulls away from the loading dock when an added load, such as a fork lift truck, is on the ramp, the flow across the valve ball 24 causes a pressure differential, resulting in the pressure in the lower end of cylinder 11 being greater than the pressure in the upper rod end, thereby closing valve 24 and preventing further descent of the ramp.

Figure 3:
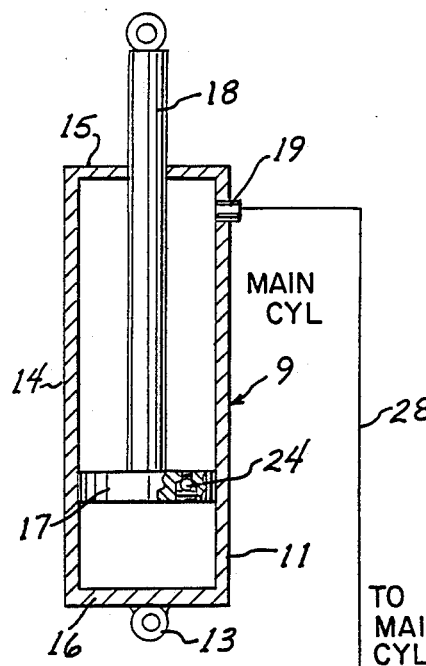
FIG. 3 is a schematic diagram showing the hydraulic circuit.
Figure 3:
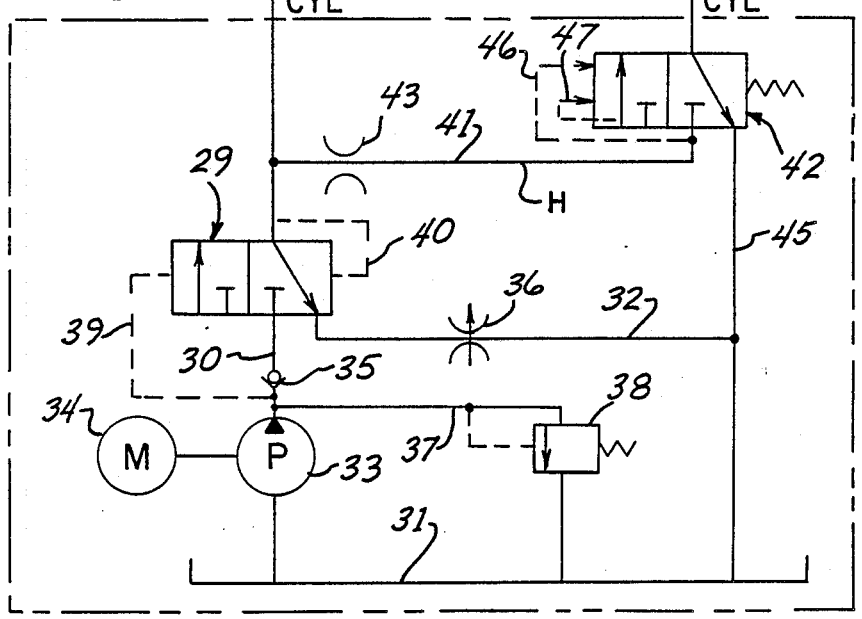

As shown in the hydraulic circuit of FIG. 3, a line 28 connects fitting 19 of cylinder 9 with a shuttle valve 29 that is located in the pump valve body. In addition, a supply line 30 connects shuttle valve 29 with a pump 33 driven by motor 34 is connected in supply line 30. Also located in supply line 30 between pump 33 and shuttle valve 29 is a check valve 35.

A return line 32,45 connects shuttle valve 29 with reservoir 31 and an adjustable orifice 36 is connected in return line 32. Orifice 36 acts to control the flow of fluid return through line 32 and thus the rate of descent of the ramp as will be hereinafter described.

In addition, a line 37 interconnects the supply line 30, at a location downstream of pump 33, with reservoir 31 and a conventional relief valve 38 is connected in line 37.

Pilot line 39 interconnects supply line 30 with shuttle valve 29 and a second pilot line 40 interconnects line 28 with the shuttle valve. Pressure in line 30 generated by pump 33 will operate through pilot line 39 to move the shuttle valve to the right as shown in FIG. 3, and connects the supply line 30 with the cylinder line 28 to thereby supply fluid to the main cylinder 11. On lowering of the ramp, the back pressure in line 28 will act through pilot line 40 to move valve 29 to the left as shown in FIG. 3, and thereby connect line 28 to return line 32 to return fluid from the main cylinder to the reservoir 31.

The hydraulic system also includes a by-pass line 41 which connects cylinder line 28 with a control valve 42, and a fixed orifice 43 is located within line 41. In addition, a lip cylinder line 44 connects valve 42 to the lip cylinder 10 and a return line 45 connects the valve 42 to the reservoir 31.

Pilot line 46 interconnects by-pass line 41 and valve 42 so that a predetermined pressure in line 41 will shift valve 42 to the right, as shown in FIG. 3, to connect line 41 with line 44 to supply fluid to the lip cylinder 10. In addition, a second pilot line 47 acts to maintain valve 42 in the shifted position after the pressure in line 41 has been decreased.

Figure 4:
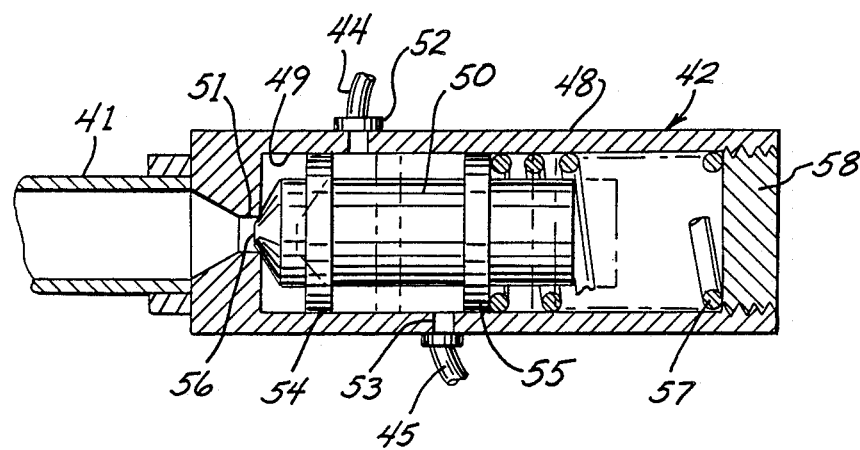
FIG. 4 is a longitudinal section of the valve that controls the flow of fluid to the lip cylinder.

A construction of valve 42 is best illustrated in FIG. 4. Valve 42 includes an outer body 48 having a central cavity 49 and a valve 50 is mounted for sliding movement within cavity 49. One end of the valve body 48 is provided with a first opening 51 which defines a valve seat and is connected to line 41, while the body 48 is also provided with a second opening 52 which is connected to line 44 and a third opening 53 which is connected to return line 45. As shown in FIG. 4, a pair of collars 54 and 55 are mounted in spaced relation on the valve 50.

The tip 56 of valve 50 is biased to a closed position with respect to the valve seat 51 by a spring 57 which is interposed between collar 55 and a spring retainer 58 which is threaded within the end of the valve body 48.

Valve 42 is constructed so that a pressure in by-pass line 41, in excess of that required to raise ramp 5 acts on the exposed area of tip 56, resulting in a force of sufficient magnitude to overcome the force of spring 57 and unseat valve tip 56 from seat 51. Once the tip 56 of the valve has been unseated, a larger area of the end of the valve, including the face of collar 54, will be exposed to the fluid pressure so that a substantially lesser pressure will be required to maintain the valve in the opened or shifted position, as compared to the pressure required to initially unseat the tip 56 from the opening 51.

When the valve 50 has been shifted to the right, as shown by the dashed lines in FIG. 4, fluid can then flow from the line 41, through cavity 49 to line 44, to the lip cylinder to thereby extend ram 59 of the lip cylinder to pivot the lip upwardly. With the valve 50 in the shifted position, the surface area of the valve exposed to the fluid pressure is increased so that a lesser pressure is required to exert a force sufficient to overcome the force of spring 57 to retain the valve in the shifted position. In practice, a lesser force, about 1/12 the force required to initially shift the valve, will hold the valve in the shifted position.

Ramp 5 is normally stored in the horizontal dock level position. After a truck pulls into position in front of the dock 3 for loading, the operator will push the "raise" button on the control panel which operates the motor pump unit to supply pressurized fluid from the reservoir through supply line 30 to the valve 29. The pressurized fluid acting through pilot line 39 will shift valve 29 to thereby connect line 30 with cylinder line 28 to supply pressurized fluid to the main cylinder 9. The pressure on both sides of piston 17 will be balanced due to he free flow through passage 20 in the piston. However, because the pressure acts against a larger surface area on the lower face of the piston than on the upper face, due to the presence of piston rod 18, the differential force will move the piston upwardly to extend the piston rod 18 and pivot the ramp 5 to the upwardly inclined position, as shown in FIG. 1. As the piston moves upwardly, fluid will pass through the passage 20 from the upper end of the cylinder 11 to the lower end.

When the piston 17 reaches the end of its upward stroke and bottoms out, the pressure in the line 28 will increase and the increased pressure acting through by-pass line 41 will be sufficient to unseat the tip 56 of valve 50 from the seat 51, to thereby shift the valve 50 to a position where the by-pass line 41 is connected to line 44, thereby supplying fluid to the lip cylinder. Supplying fluid to the lip cylinder will extend the ram 59 to thereby pivot the lip 6 from the pendant to the extended position.

As valve 42 shifts to connect line 41 to the lip line 44, the pressure is reduced until the ram 59 of the lip cylinder bottoms out. At this time the relief valve 38 will open to release the pressure in the system.

With the ramp 5 fully elevated, operation of the motor 34 and pump 33 is discontinued and the ramp will then descend by gravity. The back pressure in line 28 will pilot the valve 29, so that the fluid will then be returned through valve 29 and return line 32 to the reservoir 31, through the adjustable orifice 36 which will act to control the downward movement of the ramp. However, the back pressure in lines 28 and 41 will be sufficient to maintain the valve 42 in the shifted position so that the lip will remain in the extended position.

When the extended lip engages the truck bed, the descent of the ramp and lip is terminated, with the result that the pressure in lines 28 and 41 will be reduced to ambient. This reduction in pressure will enable the biasing force to shift the valve 42 back to its original position, connecting lip line 44 with the return line 45, to thereby permit the fluid within the lip cylinder to return to the reservoir.

When the loading operation is complete, the operator may push the "raise" button on the control panel. As before, this will result in the extension of main cylinder 9, and pivot the ramp to an upwardly inclined position. The lip which was supported by the truck bed will be allowed to fall by gravity because lip cylinder 10 is ported to the reservoir through line 44, valve 42 and line 45.

Also when the truck pulls away from the dock, the lip is then free to fall by gravity to its original pendant position.

The invention provides a substantial simplification of the hydraulic system over conventional types and reduces the overall cost of the hydraulic system. With the system of the invention, only a pair of external hydraulic lines are required, one being connected to the main cylinder 9 and the other to lip cylinder 10. Not only does this system reduce the overall cost, but also provides a cleaner appearance and substantially reduces the number of potential leakage sites.

As a further advantage, the velocity fuse, which prevents the rapid descent of the ramp, is built into the piston of the main cylinder unit. This reduces the cost of the velocity fuse over conventional types. As the velocity fuse is located internally of the cylinder, tampering or re-adjustment of the velocity fuse is prevented, as can occur if the velocity fuse is located externally.

Figure 5:
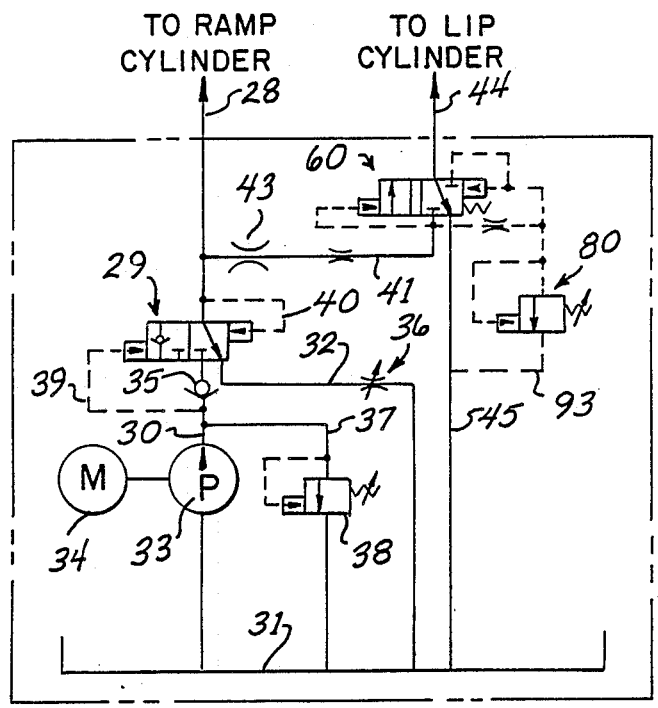
FIG. 5 is a schematic diagram showing the hydraulic circuit for a modified form of the invention.
Figure 6:
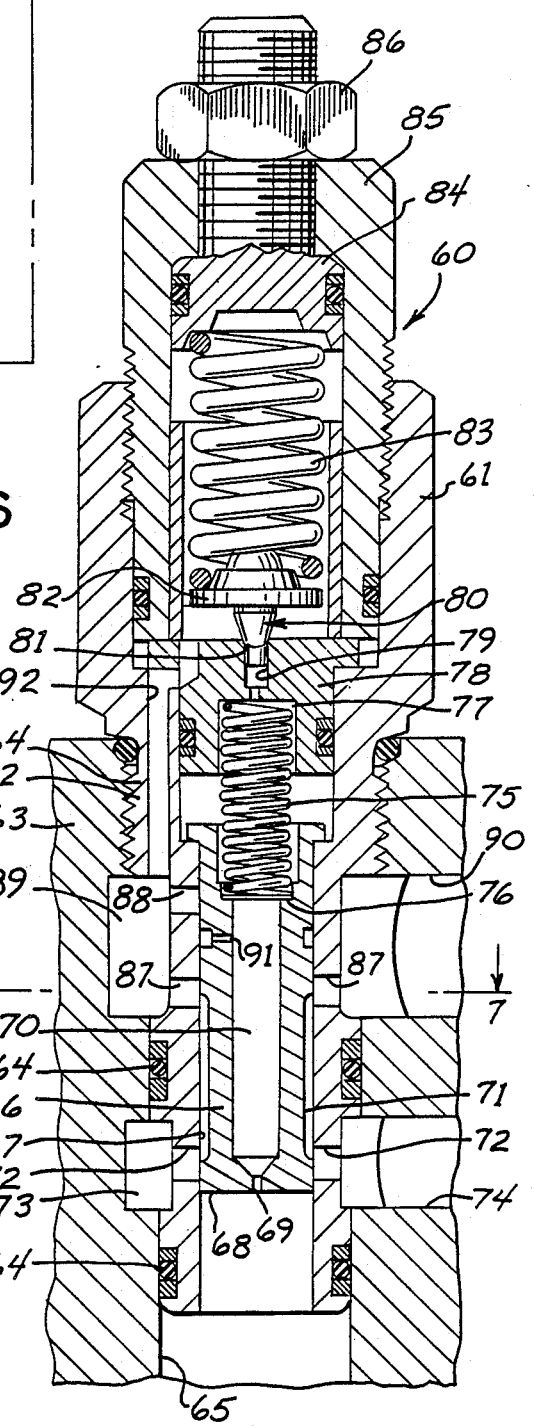
FIG. 6 is a longitudinal section of the lip control valve as used in the modified form of the invention.
Figure 7:
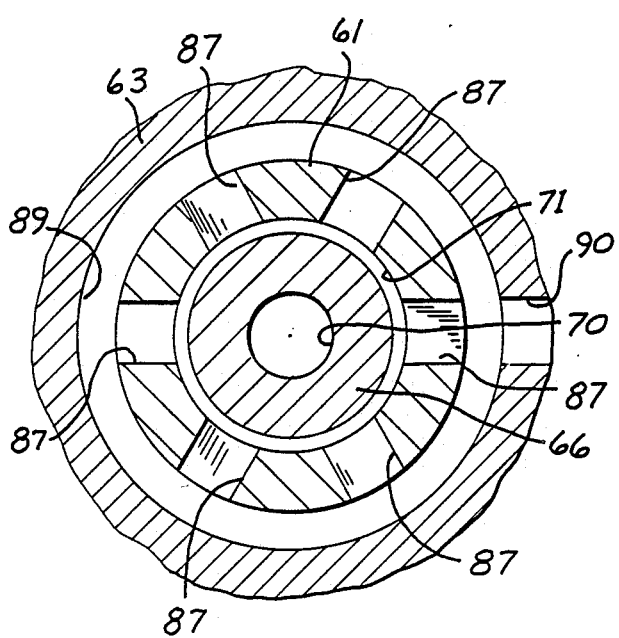
FIG. 7 is a section taken along line 7—7 of FIG. 6.

In a modified form of the invention, as shown in FIGS. 5-7, the pressure required to unseat the second or lip control valve to supply fluid to the lip cylinder is adjustable independently of the pressure required to return the lip control valve to its seated position. With this construction, the unseating pressure can be adjusted according to the size and weight of the dockboard without altering the return pressure for the valve, thus providing more precise control of the action of the lip.

In this embodiment, valve 60 is substituted in the hydraulic system, as shown in FIG. 5, for valve 42 of the first embodiment. Valve 60 includes a hollow valve body 61 having an externally threaded section 62 that is threaded to pump block 63. O-ring assemblies 64 provide seals between valve body 61 and block 63. The open inner end of body 61 communicates with pressure passage 65 which is connected to pressure line 41.

A tubular valve spool 66 is mounted for sliding movement within the central bore 67 of body 61. The outer end 68 of spool valve 66 is generally flat and is disposed normal to the axis of the spool valve and contains a small diameter central orifice 69 which provides communication between pressure passage 65 and the internal passage 70 of the spool valve. Valve spool 66 is adapted to slide in bore 67, and the central portion of valve spool 66, spaced from end 68, has a reduced diameter to provide an annular clearance between spool 66 and bore 67, as indicated by 71.

The inner end of body 61 is provided with a plurality of radial ports 72 which communicate with annular chamber 73 in block 63 and chamber 73 is connected through passage 74 and line 44 to lip cylinder 10, as shown in FIG. 5.

Valve spool 66 is biased to an inner position where the inner end of the valve closes off the ports 72 by a compression spring 75. One end of spring 75 bears against an annular shoulder 76 formed in valve spool 66, while the opposite end of spring 75 is engaged with a central recess 77 in valve seat 78, which is mounted in body 61.

Valve seat 78 is provided with a central opening 79, which is enclosed by a poppet valve 80. Valve 80 includes a small diameter end 81, which is received within opening 79, and an the enlarged head 82.

To bias valve 80 to a closed position, a coil spring 83 is interposed between head 82 and an adjusting screw 84 which is threaded within a central opening in cap 85. Cap 85, in turn, is threaded within the outer end of valve body 61. By threaded adjustment of screw 84, the force of spring 83 can be adjusted, thereby selectively varying the force required to open valve 80. This adjustment is independent of the biasing force which biases valve spool 66 to the closed position. A lock nut 86 can be engaged with the outer end of screw 84 to lock the screw in the desired position.

Valve body 61 is provided with radial ports 87, as well as a radial port 88 which is located axially of ports 87. Ports 87 and 88 communicate with an annular chamber 89 in block 63, and chamber 89 is connected through passage 90 and line 45 to reservoir 31.

In addition, valve spool 66 is provided with a radial port 91 which, as shown in FIG. 6, is closed off by valve body 61 when the spool valve is in the inner closed position, as seen in FIG. 6. However, axial shifting of the valve spool 66 will bring port 91 into communication with port 88 in the valve body.

A further passage 92 is formed in body 61 and valve seat 78 and provides communication between the interior of cap 85 and chamber 89 in block 63. When poppet valve 80 is opened, fluid can flow from the interior of the valve spool 66 through opening 79 and then through passage 92 and chamber 89 to reservoir 31.

With the valve construction shown in FIGS. 5-7, the ramp is elevated in the manner described in connection with the first embodiment. When the piston 17 of the main cylinder 9 reaches the end of its upward stroke and bottoms out, the pressure in line 28 will increase and the increased pressure acting through line 41 will be applied to the valve spool 66 through passage 65. Due to orifice 69 and passage 70, the pressure will be applied to both ends of the spool valve. As the force of the fluid pressure acting on the exposed area of the lower end of spool valve 66 is equal to the force acting on the upper end of the spool valve (the sum of the force of spring 75 plus the force of the fluid pressure acting on the exposed area of the upper end), the valve will be maintained in the closed position, as shown in FIG. 6.

The fluid pressure acting through spool valve 66 will also be applied to the inner small diameter end 81 of poppet valve 80, which is biased to a closed position by spring 83. When the pressure applied to poppet valve end 81 is great enough to overcome the force of spring 83, the poppet valve will open, allowing fluid to flow through passage 92, chamber 89, passage 90, and line 45 to the reservoir 31 As fluid flows through the spool valve, it passes through the small diameter orifice 69, causing a pressure drop across the orifice, which is sufficient to produce a higher force on end 68 of the valve, as opposed to the opposite end. This resulting differential in force will move the valve spool 66 axially in body 61 against the force of spring 75 to open the ports 72 and supply fluid from passage 65, through ports 72 to chamber 73 and then through passage 74 and line 44 to the lip cylinder to extend the lip. When the ports 72 to the lip cylinder are open, the pressure will drop in the pressure line, which will cause the poppet valve 80 to move to the closed position, under the force of spring 83. Fluid will continue to flow from passage 65 through orifice 69 into passage 70, and out port 91 through port 88 into chamber 89 and through passage 90 and line 45 to reservoir 31. This flow maintains the pressure differential through orifice 69, causing higher pressure on face 68, keeping spool 66 in the shifted position.

When the ram 59 of the lip cylinder 10 bottoms out, the relief valve 38 will open to release the pressure in the system. With the ramp 5 fully elevated, operation of the motor and pump 33 is discontinued and the ramp will then descend by gravity. The back pressure in line 28 will pilot the valve 29, so that the fluid will then be returned through valve 29 and line 32 to the reservoir 31 through the adjustable orifice 36, which will act to control the downward movement of the ramp. However, the back pressure in lines 28 and 41, and the resulting flow through passage 65, orifice 69, passage 91, port 88, chamber 89, passage 90, and line 45 to reservoir 31, will result in a pressure differential across orifice 69 sufficient to maintain the valve spool 66 in the shifted position, so that the lip will remain in the extended position.

When the extended lip engages the truck bed, the descent of the ramp and lip is terminated with the result that the pressure in lines 28 and 41 will be reduced to ambient. Valve spool 66 will then shift to its original position, as seen in FIG. 6. When the truck pulls away from the dock, the lip is then free to fall by gravity to its original pendant position, and as the lip falls, fluid will be returned from the lip cylinder 10 through line 44 and will flow through passage 74, chamber 73, ports 72 and clearance 71 to ports 87, chamber 89, passage 90 to reservoir 31.

The construction shown in FIGS. 5 and 6 has distinct advantages. While the lips of different dockboards may be somewhat uniform in size and weight, the ramps of dockboards may vary considerably in size and weight. The sequence pressure, which is the pressure in excess of that required to raise the ramp and supply pressure to the lip cylinder, will necessarily vary depending upon the weight of the ramp. As the sequence pressure and the return pressure, which is the pressure at which the lip control valve will return to its original position, are usually in a ratio of about 10:1, an increase in sequence pressure, in a conventional system, will necessarily result in an increase in return pressure. Increasing the return pressure will mean that the lip will fall by gravity at a higher pressure, which is undesirable, for it is preferred that the return pressure be as low as possible. However, the construction shown in FIGS. 5–7, overcomes this problem by enabling the sequence pressure to be independently adjusted through operation of the adjusting screw 84 and this adjustment is independent and will not effect the return pressure, which is determined by the force of spring 75. Thus, with the construction of the invention, a low return pressure can be obtained while providing an independent adjustment of the sequence pressure to accommodate the weight of the ramp of the dockboard.

Various modes of carrying out the invention are contemplated as being within the scope of the following claims particularly pointing out and distinctly claiming the subject matter which is regarded as the invention.

I claim:

1. A hydraulically operated dockboard, comprising a supporting structure, a ramp hinged at its rear edge to the supporting structure and movable between a generally horizontal position and an upwardly inclined position, a lip hinged to the forward edge of the ramp and movable between a downwardly hanging pendant position and outwardly extending position, hydraulic cylinder means interconnecting said ramp and said supporting structure and including a cylinder to contain a hydraulic fluid and a piston slidable in said cylinder, said piston having a longitudinal passage therethrough, a valve member disposed in said passage and having an open and a closed position, means for biasing said valve member to said open position whereby said fluid can flow freely through said passage as the piston moves in said cylinder, and means responsive to a predetermined downward force being applied to the ramp for closing said valve member and preventing descent of the ramp.

2. The dockboard of claim 1, wherein said passage includes a valve seat and said biasing means comprises a pair of springs engaged with said valve member and constructed and arranged to bias said valve member out of engagement with said valve seat.

3. The dockboard of claim 2, wherein said valve member is a ball and said springs are engaged with opposed portions of said ball.

4. A hydraulically operated dockboard comprising a supporting structure, a ramp hinged at its rear edge to the supporting structure and movable between a generally horizontal position and an upwardly inclined position, a lip hinged to the forward edge of the ramp and movable between a downwardly hanging pendant position and outwardly extending position, a first hydraulic cylinder unit interconnecting the ramp and the supporting structure, a second hydraulic cylinder unit interconnecting the ramp and the lip, a hydraulic system for supplying hydraulic fluid to said first and second cylinder units and including a reservoir for hydraulic fluid, first conduit means interconnecting said reservoir and said first cylinder unit, pumping means for supplying hydraulic fluid under pressure through said first conduit means to said first cylinder unit to thereby extend said first cylinder unit and raise the ramp, second conduit means connecting said first conduit means to said second cylinder unit, valve means in said second conduit means having a first position wherein said second cylinder unit is connected to said reservoir and having a second position where said second cylinder unit is connected to said first conduit means, said valve means being constructed and arranged so that a first hydraulic pressure in excess of that required to extend said first cylinder unit will shift said valve means from said first position to said second position to thereby supply pressurized fluid to said second cylinder unit to extend said lip, said first cylinder unit including a cylinder and a piston mounted for sliding movement within said cylinder, said first cylinder unit also including a piston rod connected to said piston and extending outwardly through an upper end of said cylinder, said first conduit means being connected to the upper end of said cylinder, said piston having a longitudinal passage therethrough, a valve member disposed in said passage and having an open and a closed position, means for biasing said valve member to said open position, and means responsive to a predetermined downward force being applied to the ramp for closing said valve member and preventing descent of the ramp.

5. A hydraulically operated dockboard, comprising a supporting structure, a ramp hinged at its rear edge to the supporting structure and movable between a generally horizontal position and an upwardly inclined position, a lip hinged to the forward edge of the ramp and movable between a downwardly hanging pendant position and outwardly extending position, a first hydraulic cylinder unit interconnecting the ramp and the supporting structure, a second hydraulic cylinder unit interconnecting the ramp and the lip, a hydraulic system for supplying hydraulic fluid to said first and second cylinder units and including a reservoir for hydraulic fluid, first conduit means interconnecting said reservoir and said first cylinder unit, pumping means for supplying hydraulic fluid under pressure through said first conduit means to said first cylinder unit to thereby actuate said first cylinder unit and raise the ramp, second conduit means connecting said first conduit means to said second cylinder unit, valve means connected in said second conduit means, means responsive to a first elevated fluid pressure in said system in excess of that required to raise the ramp for opening said valve means to thereby supply pressurized fluid to said second cylinder unit to extend said lip, means responsive to a decrease in fluid pressure from said first pressure to a second fluid pressure substantially beneath said first pressure for closing said valve means and returning fluid from said second cylinder unit to said reservoir, and adjusting means for selectively adjusting the magnitude of one of said pressures independently of the other of said pressure.

6. The dockboard of claim 5, wherein said adjusting means is constructed and arranged to adjust the magnitude of said first pressure independently of the magnitude of said second pressure.

7. A hydraulically operated dockboard, comprising a supporting structure, a ramp hinged at its rear edge to the supporting structure and movable between a generally horizontal position and an upwardly inclined position, a lip hinged to the forward edge of the ramp and movable between a downwardly hanging pendant position and outwardly extending position, a first hydraulic cylinder unit interconnecting the ramp and the supporting structure, a second hydraulic cylinder unit interconnecting the ramp and the lip, a hydraulic system for supplying hydraulic fluid to said first and second cylinder units and including a reservoir for hydraulic fluid, first conduit means interconnecting said reservoir and said first cylinder unit, pumping means for supplying hydraulic fluid under pressure through said first conduit means to said first cylinder unit to thereby extend said first cylinder unit and raise the ramp, second conduit means connecting said first conduit means to said second cylinder unit, a valve body disposed in said second conduit means, first valve means disposed in said body and movable between a first position where said first conduit means is connected to said lip cylinder unit and a second position where said lip cylinder unit is connected to said reservoir, said first valve means having a longitudinal passage with said passage including a small diameter orifice at a first end thereof, first biasing means acting against a second end of said first valve means for biasing said first valve means to said second position, second valve means interconnecting said passage and said reservoir and movable between an open position and a closed position, second biasing means for biasing said second valve means to the closed position, the flow of fluid in said first conduit means acting through said passage when said first valve means is in the second position to open said second valve means and cause a pressure differential on opposite ends of said first valve means to thereby move said first valve means to said first position and supply fluid from said first conduit means to said lip cylinder unit, and adjusting means for adjusting the force of one of said biasing means.

8. The dockboard of claim 7, wherein said adjusting means is operably connected to said second biasing means.

9. The dockboard of claim 8, wherein said second biasing means comprises a spring and said adjusting means comprises a screw operably connected to said spring.

10. The dockboard of claim 7, wherein the force exerted by said second biasing means is greater than the force exerted by said first biasing means.

* * * * *